US008550791B2

(12) United States Patent
DeFilippis et al.

(10) Patent No.: US 8,550,791 B2
(45) Date of Patent: Oct. 8, 2013

(54) TORSIONAL RESTRAINT FOR JET PUMP ASSEMBLY

(75) Inventors: Michael S. DeFilippis, Wilmington, NC (US); Robin D. Sprague, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 385 days.

(21) Appl. No.: 12/689,524

(22) Filed: Jan. 19, 2010

(65) Prior Publication Data
US 2011/0176938 A1    Jul. 21, 2011

(51) Int. Cl.
F04F 5/00    (2006.01)

(52) U.S. Cl.
USPC ............ 417/151; 376/372; 376/392; 376/407

(58) Field of Classification Search
USPC ................. 417/151, 360; 376/286, 372, 392; 248/49; 403/396, 398, 399
See application file for complete search history.

(56) References Cited

U.S. PATENT DOCUMENTS

| | | | | |
|---|---|---|---|---|
| 44,587 | A * | 10/1864 | Angiers et al. | 417/151 |
| 3,716,451 | A * | 2/1973 | Van Sickel et al. | 376/461 |
| 4,406,047 | A * | 9/1983 | Jeffers et al. | 29/426.5 |
| 4,499,691 | A * | 2/1985 | Karazim et al. | 451/439 |
| 4,902,204 | A * | 2/1990 | Hofstad | 417/360 |
| 5,954,305 | A | 9/1999 | Calabro | |
| 5,978,433 | A | 11/1999 | Erbes et al. | |
| 6,053,652 | A * | 4/2000 | Deaver et al. | 403/24 |
| 6,095,460 | A * | 8/2000 | Mercer et al. | 248/59 |
| 6,108,391 | A * | 8/2000 | Deaver et al. | 376/262 |
| 6,195,892 | B1 * | 3/2001 | Weems et al. | 29/890.031 |
| 6,234,541 | B1 * | 5/2001 | Wagner et al. | 285/197 |
| 6,394,765 | B1 * | 5/2002 | Erbes et al. | 417/360 |
| 6,549,601 | B1 * | 4/2003 | Aoki et al. | 376/260 |
| 6,647,083 | B1 * | 11/2003 | Jensen | 376/286 |
| 6,719,482 | B2 * | 4/2004 | Morita | 403/408.1 |
| 7,185,798 | B2 * | 3/2007 | Butler | 228/44.5 |
| 7,272,204 | B2 * | 9/2007 | Jensen | 376/260 |
| 7,445,408 | B2 * | 11/2008 | Stankus et al. | 405/288 |

(Continued)

FOREIGN PATENT DOCUMENTS

| | | |
|---|---|---|
| EP | 1 014 385 A2 | 6/2000 |
| JP | 2001013284 A | 1/2001 |
| WO | 00/62303 A1 | 10/2000 |

OTHER PUBLICATIONS

European Search Report issued in connection with EP Patent Application No. 11151423.8, Nov. 25, 2011.

(Continued)

Primary Examiner — Devon Kramer
Assistant Examiner — Christopher Maxey
(74) Attorney, Agent, or Firm — Harness, Dickey & Pierce, P.L.C.

(57) ABSTRACT

Disclosed are various torsional restraint systems for torsionally restraining a jet pump assembly, wherein the jet pump assembly includes a riser pipe, a transition assembly on the riser pipe, and a restrainer bracket connecting a first and a second inlet mixer to the riser pipe. The torsional restraint system includes a first contact member operatively attached to a side of the jet pump assembly and a second contact member operatively attached to the side of the jet pump assembly and disposed from the first contact member such that the first and second contact members restrain the riser pipe from rotating about a centerline of the riser pipe.

15 Claims, 11 Drawing Sheets

(56) References Cited

U.S. PATENT DOCUMENTS

| | | | |
|---|---|---|---|
| 7,708,234 B2* | 5/2010 | Kossak | 248/49 |
| 8,077,823 B2* | 12/2011 | Baversten et al. | 376/286 |
| 8,170,174 B1* | 5/2012 | Lentner et al. | 376/372 |
| 2001/0001009 A1 | 5/2001 | Wivagg et al. | |
| 2004/0056156 A1 | 3/2004 | Dodson | |
| 2004/0190671 A1 | 9/2004 | Wivagg | |
| 2005/0006535 A1* | 1/2005 | Brown et al. | 248/70 |
| 2005/0247754 A1* | 11/2005 | Butler | 228/44.5 |
| 2007/0189434 A1* | 8/2007 | Jensen | 376/260 |
| 2010/0316180 A1* | 12/2010 | Lentner et al. | 376/260 |
| 2011/0146597 A1* | 6/2011 | DeFilippis et al. | 122/510 |
| 2012/0032064 A1* | 2/2012 | Defilippis et al. | 248/675 |
| 2012/0033781 A1* | 2/2012 | Defilippis | 376/372 |
| 2012/0033782 A1* | 2/2012 | DeFilippis et al. | 376/372 |

OTHER PUBLICATIONS

Japanese Office Action dated May 21, 2013 for corresponding Japanese Application No. 2011-008505 (full translation provided).

* cited by examiner

TORSIONAL RESTRAINT FOR JET PUMP ASSEMBLY

BACKGROUND

1. Field

The invention relates to a torsional restraint for restraining a jet pump assembly.

2. Description of the Related Art

Conventional boiling water reactors include a reactor pressure vessel (RPV) which surrounds a core shroud. The core shroud, in turn, surrounds the reactor core. Generally, each of the core shroud and the reactor pressure vessel are cylindrically shaped such that an outer diameter of the core shroud is less than an inner diameter of the reactor pressure vessel. Between the reactor pressure vessel wall and the core shroud wall is an annular space in which jet pump assemblies are typically located.

FIG. 1 illustrates a conventional jet pump assembly 25 located in the aforementioned annulus. As illustrated in FIG. 1, an inlet nozzle 10 extending through a sidewall 15 of the RPV 20, is coupled to the jet jump assembly 25. The jet pump assembly 25 includes a riser pipe 30 that extends between the shroud 35 and the sidewall 15 of the RPV 20. The riser pipe 30 is coupled to two jet pumps 35A and 35B by a transition assembly 40. Each jet pump 35A and 35B includes a jet pump nozzle 42, a suction inlet 45, an inlet mixer, and a diffuser 55. For example, the first jet pump 35A includes a first inlet mixer 50A and the second jet pump 35B includes second inlet mixer 50B. The jet pump nozzles 42 are positioned in the suction inlets 45 that are located at a first end of inlet mixers 50A and 50B. The diffusers 55, are coupled to a second end of inlet mixers 50A and 50B by a slip joint 65. Typically, both of the inlet mixers 50A and 50B and the diffusers 55 are formed of multiple cylindrical sections. Circumferential welds 70 join the cylindrical sections together.

A support member 75 typically surrounds the riser pipe 30 and connects to the riser pipe 30 via a weld 80 which may span approximately 180 degrees around the circumference of the riser pipe 30. The inlet mixers 50A and 50B are secured to the riser pipe 30 via a restrainer bracket 100.

Referring to FIG. 2, the conventional restrainer bracket 100 includes a first yolk-like member 105A and a second yolk-like member 105B surrounding the inlet mixers 50A and 50B. The conventional restrainer bracket 100 also includes at least two set screws 110 penetrating the yolk-like members 105A and 105B and pressing against the inlet mixers 50A and 50B. Main wedges 115 also are typically provided in gaps between the yolk-like members 105A and 105B and the inlet mixers 50A and 50B so that the restrainer bracket 100 securely retains the inlet mixers 50A and 50B between the set screws 110 and the main wedges 115.

SUMMARY

Example embodiments relate to systems for torsionally restraining a jet pump assembly.

A first example embodiment provides a torsional restraint system for a jet pump assembly, wherein the jet pump assembly includes a riser pipe in fluid communication with a first and a second inlet mixer. The torsional restraint system may include a first contact member operatively attached to a side of the jet pump assembly and a second contact member operatively attached to the side of the jet pump assembly and disposed from the first contact member such that the first and second contact members restrain the riser pipe from rotating about a centerline of the riser pipe.

A second example embodiment of the present invention provides a hard stop unit. In accordance with this example embodiment, the hard stop unit may include an h-shaped bracket having an internally threaded hole penetrating a side of the h-shaped bracket and a threaded bolt protruding from a bottom surface of the h-shaped bracket. The hard stop unit may also include a locking cap with a hole through which the threaded bolt passes and a nut engaging the threaded bolt. Additionally, the hard stop unit may include a threaded contact member having external threads engaging the internally threaded hole of the h-shaped bracket.

A third example embodiment of the present invention includes a hard stop unit. In accordance with this example embodiment, the hard stop unit may include a U-shaped mounting plate having a first member, a second member parallel to the first member, and a third member connecting the first member to the second member. The hard stop unit may further include a first bracket on the third member arranged near the first member, wherein the first bracket includes a first internally threaded hole. The hard stop unit may also include a second bracket on the third member arranged near the second member, wherein the second bracket includes a second internally threaded hole. The hard stop unit may also include a first externally threaded contact member engaging the first internally threaded hole and a second externally threaded contact member engaging the second internally threaded hole. The hard stop unit may also include first and second accessory members provided on a lower surface of the third member, wherein each of the first and second accessory members include a hole engaging pinch bolts. The hard stop unit may further include a first J-shaped accessory member provided on a bottom surface of the first member and a second J-shaped accessory member provided on a bottom surface of the second member.

A fourth example embodiment of the present invention includes a hard stop unit. In accordance with this example embodiment, the hard stop unit may include an I-shaped mounting plate having a first member, a second member parallel to the first member, and a third member connecting the first member to the second member. The hard stop unit may also include a first bracket on the first member, wherein the first bracket includes a first internally threaded hole. The hard stop unit may also include a second bracket on the first member, wherein the second bracket includes a second internally threaded hole. The hard stop unit may further include a first externally threaded contact member engaging the first internally threaded hole and a second externally threaded contact member engaging the second internally threaded hole. The hard stop unit may further include two J-shaped mounting hooks attached to the third member.

BRIEF DESCRIPTION OF THE DRAWINGS

Example embodiments of the present invention will be more clearly understood from the following detailed description taken in conjunction with the accompanying drawings.

DETAILED DESCRIPTION OF THE EXAMPLE EMBODIMENTS

Figure 1:
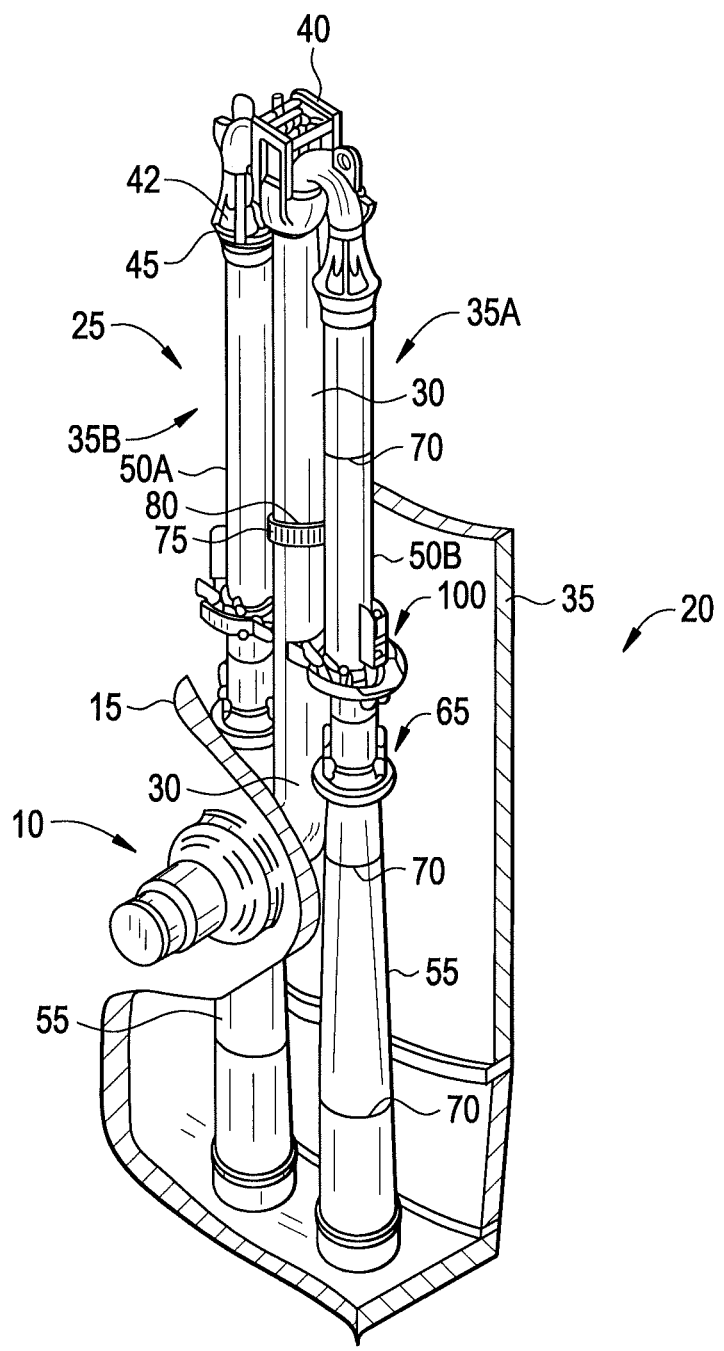
FIG. 1 is a view of a conventional jet pump assembly.
Figure 2:
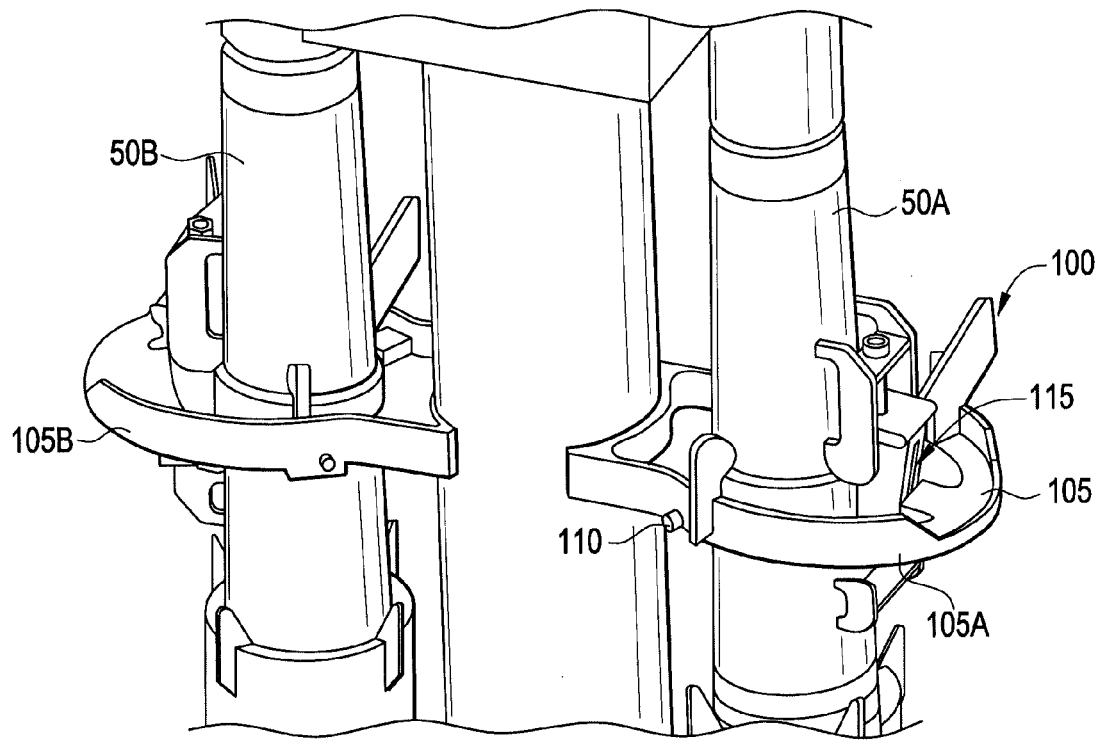
FIG. 2 is a view of a conventional restrainer bracket of a jet pump assembly.

Example embodiments of the invention will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

As discussed above, a conventional riser pipe 30 of a jet pump assembly 25 is primarily supported by a support member 75 which may be welded to the riser pipe 30. Although the weld 80 attaching the riser pipe 30 to the support member 75 adequately supports the jet pump assembly 25 under various loadings conditions, the Applicants have discovered the weld 80 may be susceptible to failure in the event a relatively large torsional load is applied to the riser pipe 30. For example, the jet pump assembly 25 may be subject to a vibration which is at or near a frequency capable of exciting the jet pump's torsional mode of vibration. In this situation, relatively large stresses may develop in the weld 80 and may cause the weld to fail thus rendering the jet pump inadequately supported. Torsional vibrations can also cause wear and/or damage at the main wedge, set screws and diffuser slip joint.

In order to prevent a jet pump assembly from generating large torsional forces in weld 80, the Applicants have developed inventive concepts for restraining the jet pump assembly 25 from generating large shear stresses in weld 80.

Example Embodiment 1

Figure 3:
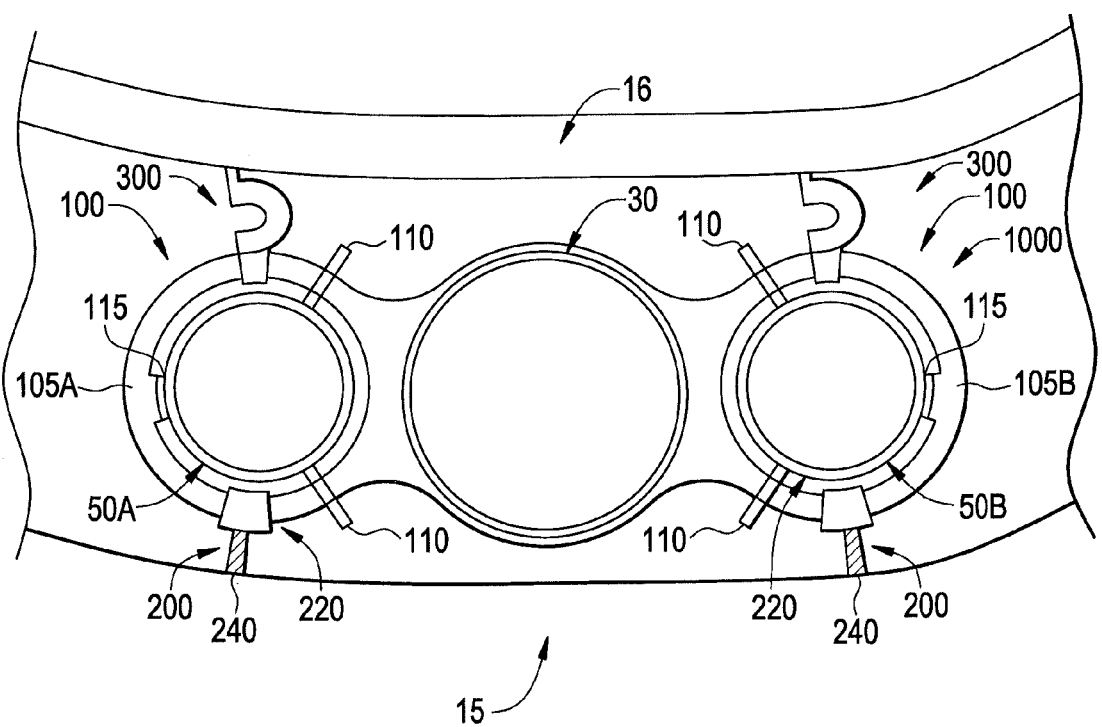
FIG. 3 is a top view of a torsional restraint system according to a first example embodiment of the present invention.

FIGS. 3-6 illustrate a first example embodiment of a torsional restraint system 1000 in which hard stop units 200 are attached to the restrainer brackets 100 of the jet pump assembly 25. As shown in FIG. 3, the hard stop units 200 are attached to the restrainer brackets 100 on a side of the restrainer bracket 100 facing the reactor pressure vessel wall 15. When attached to the restrainer bracket 100, the hard stop units 200 prevent or retard the restrainer bracket 100 from moving towards the reactor pressure vessel wall 15. Accordingly, if the riser pipe 30 was subject to torsional motion, the motion would be prevented or retarded due to the interaction of the hard stop units 200 with the reactor pressure vessel wall 15.

Figure 4:
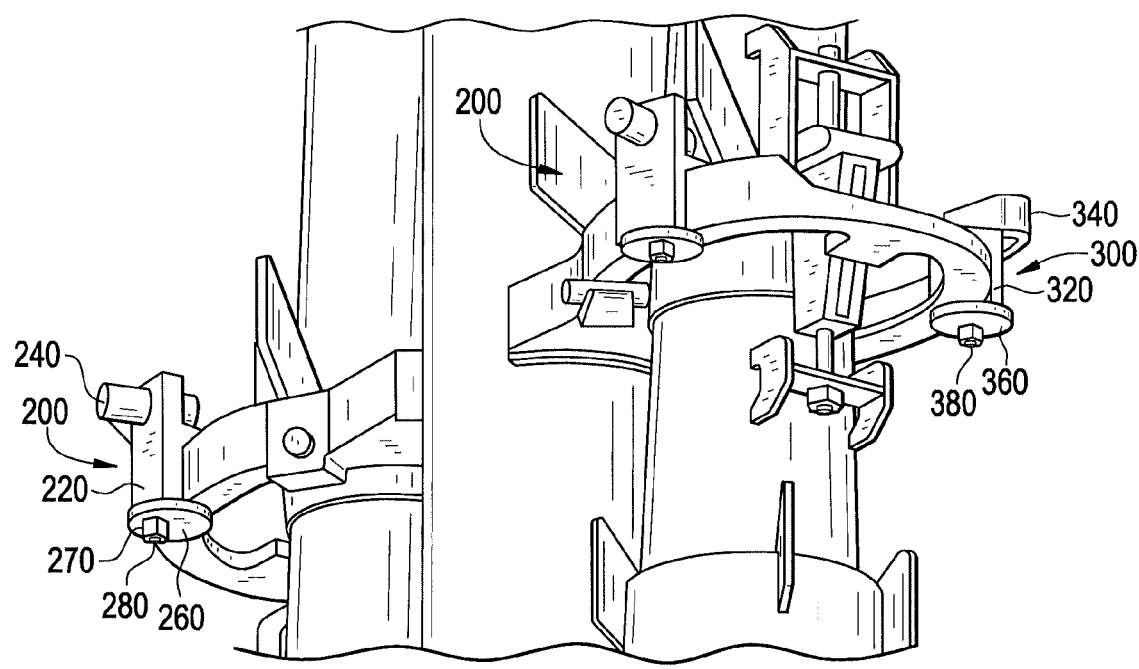
FIG. 4 is a view of the torsional restraint system according to the first example embodiment of the present invention.
Figure 5:
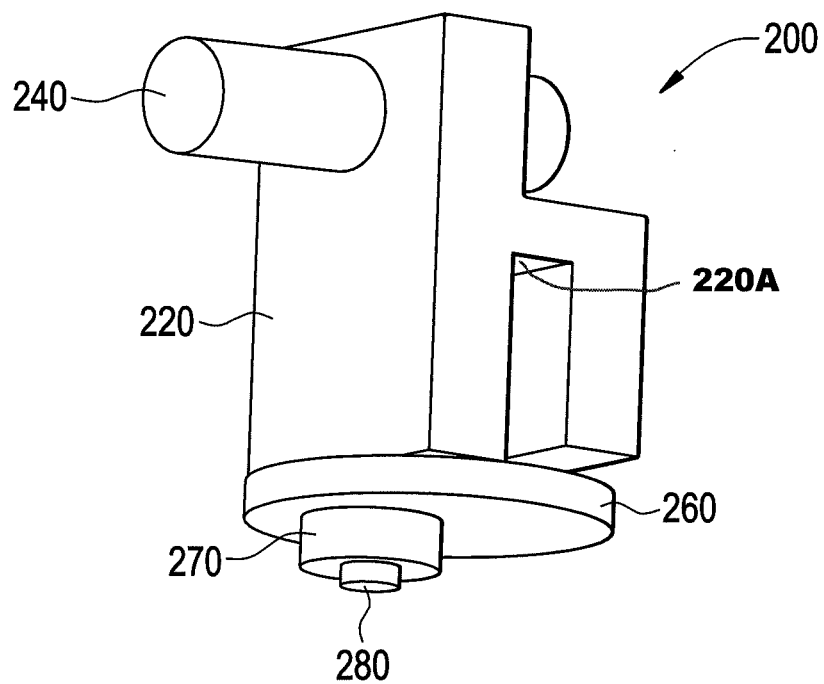
FIG. 5 is a view of a hard stop unit according to the first example embodiment of the present invention.

FIGS. 3-6 illustrate an example of hard stop units 200 attached to the restrainer bracket 100. Each of the example hard stop units 200 illustrated in FIGS. 3-6 include an h-shaped bracket 220 connected to the restrainer brackets 100. The h-shaped bracket 220, as shown in FIGS. 4 and 5, may include a threaded bolt 280 protruding from the bottom of the bracket 220. The example hard stop units 200 further includes a contact member 240, attached to the h-shaped bracket 220. The contact member 240 is configured to contact, or nearly contact, the reactor pressure vessel wall 15. The example hard stop units 200 also include a locking cap 260 with a hole through which bolt 280 may pass. The example hard stop units 200 further includes a nut 270 configured to engage the threaded bolt 280 thus securing the hard stop units 200 to the restrainer bracket 100.

The example bracket 220, as illustrated in FIGS. 3-6, is attached to the restrainer bracket 100 by clamping the restrainer bracket 100 between a lower surface 220A of the h-shaped bracket 220 and an upper surface of the locking cap 260, however, example embodiments are not limited thereto. For example, the example h-shaped bracket 220 may be may be attached to the restrainer bracket 100 by welding or bolting rather than by clamping. Furthermore, the example bracket 220 is not limited to an h-shape.

The example h-shaped bracket 220 illustrated in FIGS. 3-6 includes, for example, a hole which is threadingly engaged with the contact member 240. The contact member 240, for example, may be an externally threaded member, for example, a threaded bolt and the hole through which the contact member is engaged may include internal threads. Because the contact member 240 may be threadingly engaged with the h-shaped bracket 220, the length of the contact member 240 may be field adjusted to assure a proper fit between the bracket 220, the contact member 240, and the reactor pressure vessel wall 15.

Although the above described example embodiment describes a hard stop units 200 as including at least two separate pieces 220 and 240, this example embodiment is not limited thereto. For example, the contact member 240 and the bracket 220 may be provided as one integral hard stop. In this example, the contact member 240 may be fabricated longer than necessary so that the contact member 240 may be field cut in order to assure proper fit-up between the contact member 240 and the wall of the reactor pressure vessel. As another example, the contact member 240 may be dimensioned and rigidly attached to the bracket so that field adjustment is not necessary. In any of the aforementioned examples, the components of the hard stop units 200 may be made from a stainless steel, for example, 316 stainless steel, however, the example embodiment is not limited thereto as one skilled in the art would recognize various suitable materials which may be substituted for stainless steel.

Figure 6:
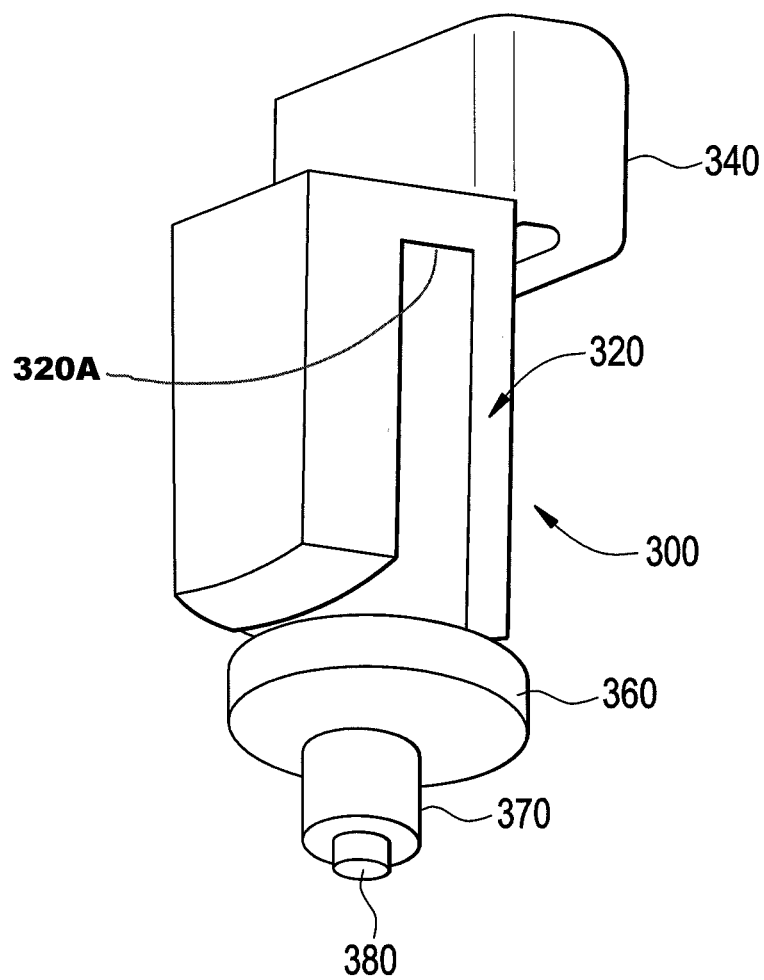
FIG. 6 is a view of a compliant spring unit according to the first example embodiment of the present invention.

In addition to providing hard stop units 200 between the restrainer brackets 100 and the reactor pressure vessel wall 15, the torsional restraint system 1000 may also include compliant spring units 300 provided between the restrainer brackets 100 and the shroud wall 16. As shown in FIG. 3, the compliant spring units 300 may be attached to a portion of the yolk-like members 105A and 105B facing the shroud wall 16. The compliant spring units 300 may include a spring 340, a spring bracket 320, a spring locking cap 360, and a nut 370. As shown in FIGS. 3 and 6, the spring bracket 320 may be h-shaped and may include a threaded bolt 380 protruding from a bottom surface of the spring bracket 320. The threaded bolt 380 may be configured to engage internal threads of the nut 370. The compliant spring unit 300 may be attached to the yolk-like members 105A and 105B by clamping the yolk-like members 105A and 105B between a bottom surface 320A of the spring bracket 320 and an upper surface of the spring locking cap 360. In general, the compliant spring 300 components may be made from stainless steel, for example, 316 stainless steel. However, example embodiments are not limited thereto as one skilled in the art could readily identify several materials which may be suitable for the compliant spring unit's 300 components.

The compliant spring units 300 may be configured to contact or nearly contact the shroud wall 16. As one skilled in the art would readily recognize, there are conditions where the shroud wall 16 will thermally expand at a rate greater than the expansion of the reactor pressure vessel wall 15. Accordingly, the Applicants note the spring 340 of the compliant spring units 300 may be constructed so as to allow for the deflection of the shroud wall 16 without imparting significant stress to the restrainer brackets 100. Accordingly, the compliant spring units 300 may include a spring 340 made from a relatively flexible material, for example, a nickel based alloy such as X750.

As illustrated in FIGS. 3-6, at least one hard stop unit 200 is provided on each of the yolk-like members 105A and 105B which are on different sides of the riser pipe 30. Accordingly, in the event the riser pipe 30 is vibrationally excited at a frequency at or near a torsional frequency of the jet pump assembly 25, the hard stops 200 would prevent the jet pump assembly 25 from undergoing relatively large rotational oscillations. Thus, the hard stop units 200 would prevent the jet pump assembly 25 from generating relatively large stresses in the weld 80.

Example Embodiment 2

Figure 7:
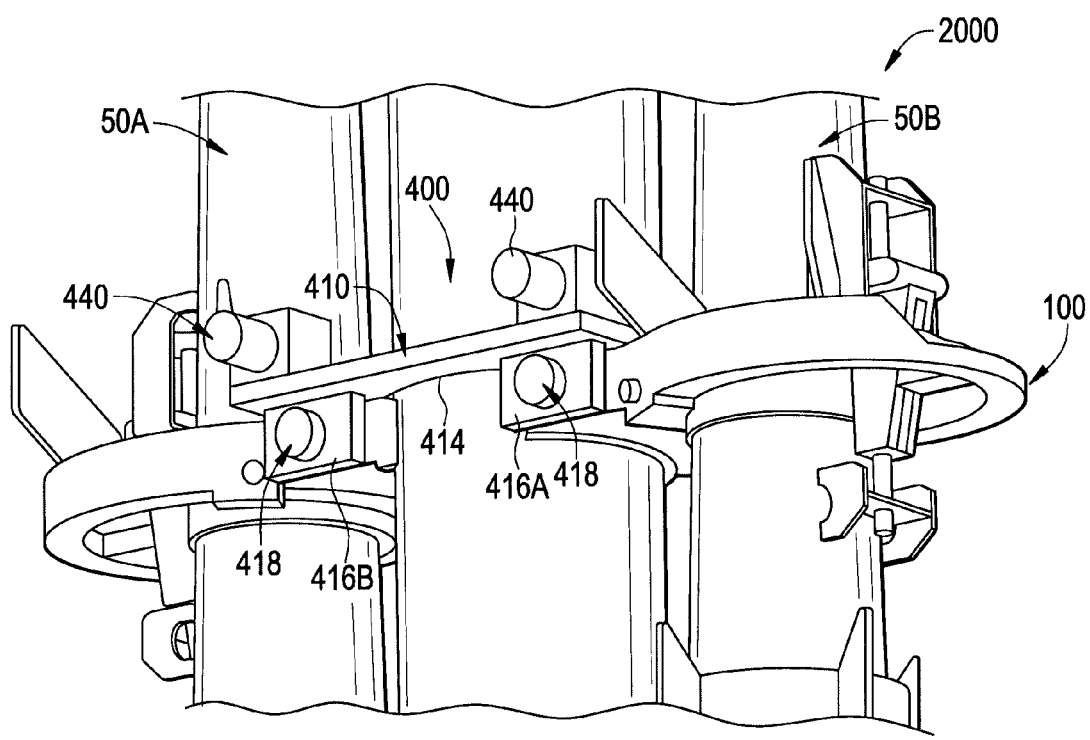
FIG. 7 is a view of a torsional restraint system according to a second example embodiment of the present invention.
Figure 8:
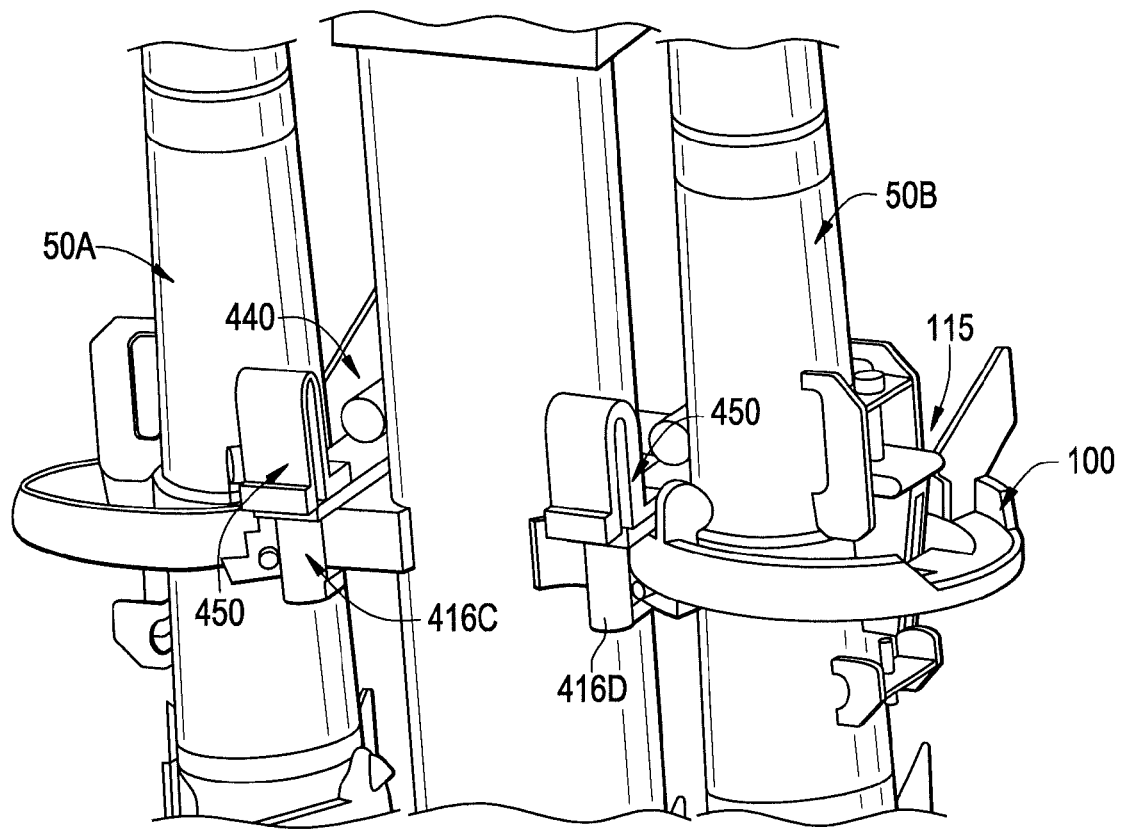
FIG. 8 is another view of the torsional restraint system according to the second example embodiment of the present invention.
Figure 9:
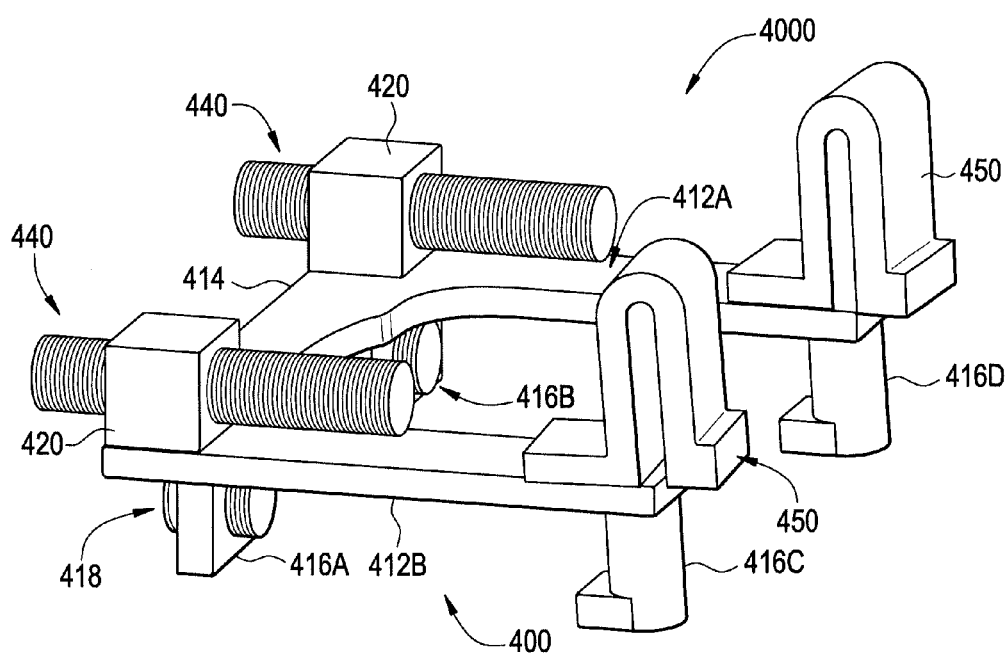
FIG. 9 is another view of the torsional restraint system according to the second example embodiment of the present invention.

FIGS. 7-9 illustrate another example of a torsional restraint system 2000. Rather than attaching separate hard stop units 200 to the yolk-like members 105A and 105B of the restrainer brackets 100, a single hard stop unit 400 may be provided between the inlet mixers 50A and 50B as shown in FIGS. 7-9. As shown in FIGS. 7-9, the hard stop unit 400 may include a U-shaped mounting plate 410 having first and second substantially horizontal and parallel members 412A and 412B and a third substantially horizontal member 414 connecting the two substantially horizontal and parallel members 412A and 412B. Each of the two substantially horizontal and parallel members 412A and 412B may be configured to fit on the restrainer brackets 100 and between the riser pipe 30 and the inlet mixers 50A and 50B so that one of the two substantially horizontal and parallel members 412A and 412B is on a first side of the riser pipe 30 and the other of the two substantially horizontal parallel members 412A and 412B is on a second side of the riser pipe 30. The third substantially horizontal member 414 may be provided at the ends of the two substantially horizontal and parallel members 412A and 412B that face the reactor pressure vessel wall 15. Accordingly, the third member 414 may be provided between the riser pipe and the reactor pressure vessel wall 15.

Although the U-shaped mounting plate 410 is described as having three members 412A, 412B, and 414, one skilled in the art would readily understand that the U-shaped mounting plate 410 may be comprised of a single plate having three regions corresponding to the three members 412A, 412B, and 414. Accordingly, members 412A, 412B, and 414 may correspond to either regions of a unitary U-shaped mounting plate or separate plates combined together to form a single U-shaped mounting plate 410. In the event the U-shaped mounting plate 410 is comprised of three separate plates, the plates may be combined by bolting or welding.

The mounting plate 410 may also include accessory members 416A, 416B, 416C, and 416D connected to the bottoms of the first and second members 412A and 412B and the third member 414 so that the mounting plate 410 may be clamped to the restrainer brackets 100. For example, the example hard stop unit 400 illustrated in FIGS. 7-9 includes accessory members 416A and 416B under a side of the mounting plate 410 facing the reactor pressure vessel wall 15 and L-shaped accessory members 416C and 416D are provided under a side of the mounting plate 410 facing the shroud wall 16. As shown in FIGS. 7-9, the L-shaped accessories 416C and 416D include a lower portion that is configured to fit underneath the restrainer brackets 100 and the accessories 416A and 416B are fitted with pinch bolts 418 which are threadingly engaged with holes in the accessories 416A and 416B which lie over a portion of the restrainer brackets 100 near the reactor pressure vessel wall 15. Accordingly, the mounting plate 410 plate may be clamped to the restrainer brackets 100 as the pinch bolts 418 are rotated.

The mounting plate 410 may also include brackets 420 attached to a top surface of the mounting plate 410 near an edge facing the reactor pressure vessel wall 15. The brackets 420 may include holes threadingly engaged with contact members 440. The contact members 440 may, for example, be threaded bolts. For example, the threaded bolts may include a portion with external threads and the holes in the brackets 420, which are engaged with the contacting members 440, may include internal threads configured to engage the external threads of the contacting members 440.

Because the contact members 440 may be threaded, the length of the contact members 440 protruding from the brackets 420 may be field adjusted to assure a proper fit between the brackets 420, the contact member 440, and the reactor pressure vessel wall 15. For example, the length of the portion of the contact members 440 protruding from the brackets 420 may be adjusted so that the contact members contact, or nearly contact, the reactor pressure vessel wall 15 while being supported by the brackets 420.

Although the above described example embodiment describes a bracket 420 and a contact member 440 as including at least two separate pieces 420 and 440, this example embodiment is not limited thereto. For example, the contact member 440 and the bracket 420 may be provided as one integral member. In this example, the contact member 440 may be fabricated longer than necessary so that the contact member 440 may be field cut in order to assure proper fit-up between the contact member 440 and the reactor pressure vessel wall 15. As another example, the contact member 440 may be dimensioned and rigidly attached to the bracket so that field adjustment is not necessary. In any of the aforementioned examples, the components of the example hard stop unit 400 may be made from a stainless steel, for example, 316 stainless steel, however, none of the examples are limited thereto as one skilled in the art would recognize various suitable materials which may be substituted for stainless steel.

In addition to providing contact members 440 configured to contact or nearly contact the wall of the reactor pressure vessel 15, the instant example torsional restraint system 4000 may also include compliant springs 450 provided on a side of the mounting plate 410 facing the shroud wall 16. As shown in FIGS. 8 and 9, two compliant springs 450 may be mounted on ends of the first and second members 412A and 412B that face the shroud wall 16. As shown, the springs 450 may resemble an inverted "U" and may be configured to contact or nearly contact the shroud wall 16. As discussed above, the spring 450 should be flexible enough to absorb any thermal movement of the shroud 35 without transferring significant stress to the mounting plate 410, in the event the shroud thermally grows faster than the reactor pressure vessel wall 15.

As illustrated in FIGS. 7-9, the hard stop unit 400 is provided with brackets 420 and contact members 440 that are positioned on different sides of the riser pipe 30. Accordingly, in the event the riser pipe 30 is vibrationally excited at a frequency at or near a torsional frequency of the jet pump assembly 25, the brackets 420 and contact members 440 of the hard stop unit 400 would prevent or retard the jet pump assembly 25 from undergoing relatively large rotational oscillations. Thus the hard stop unit 400 would prevent or retard the jet pump assembly 25 from generating relatively large stresses in the weld 80.

Example Embodiment 3

Figure 10:
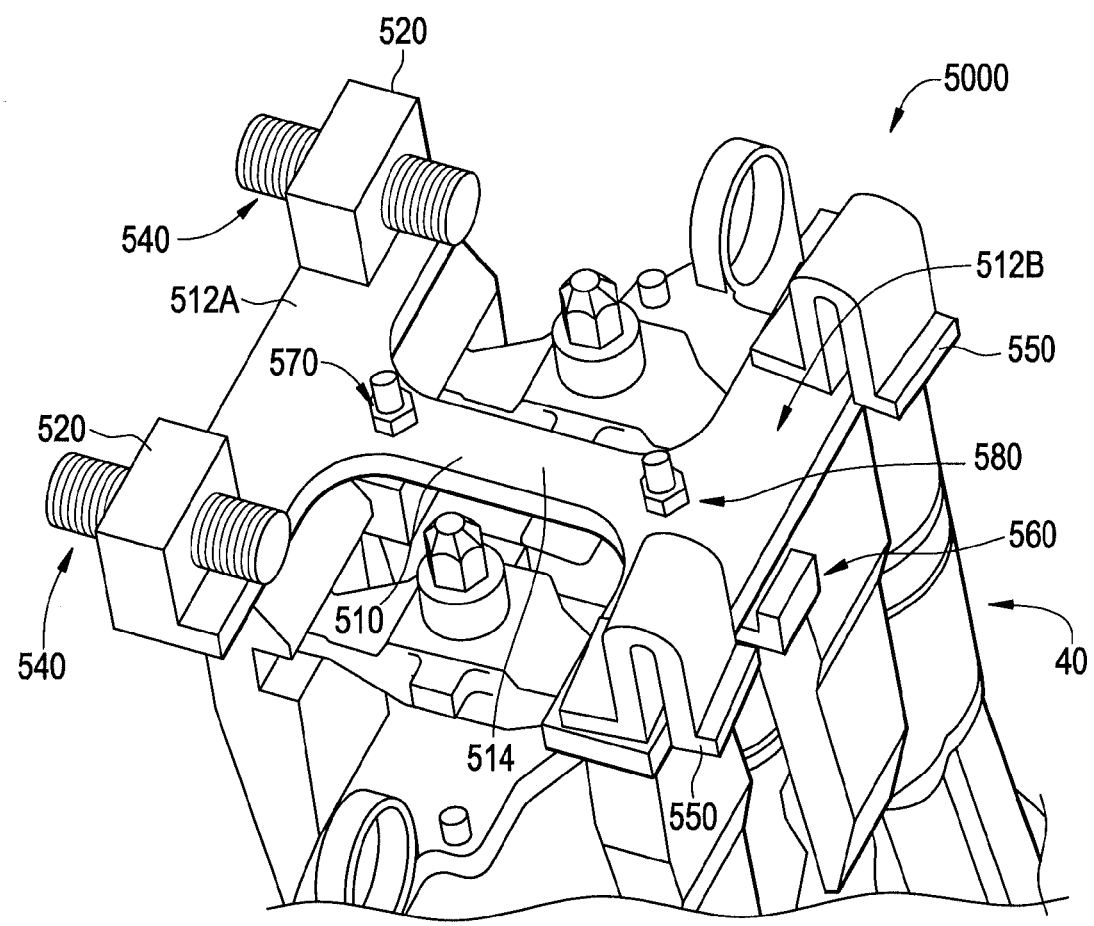
FIG. 10 is a view of a torsional restraint system according to a third example embodiment of the present invention.
Figure 11:
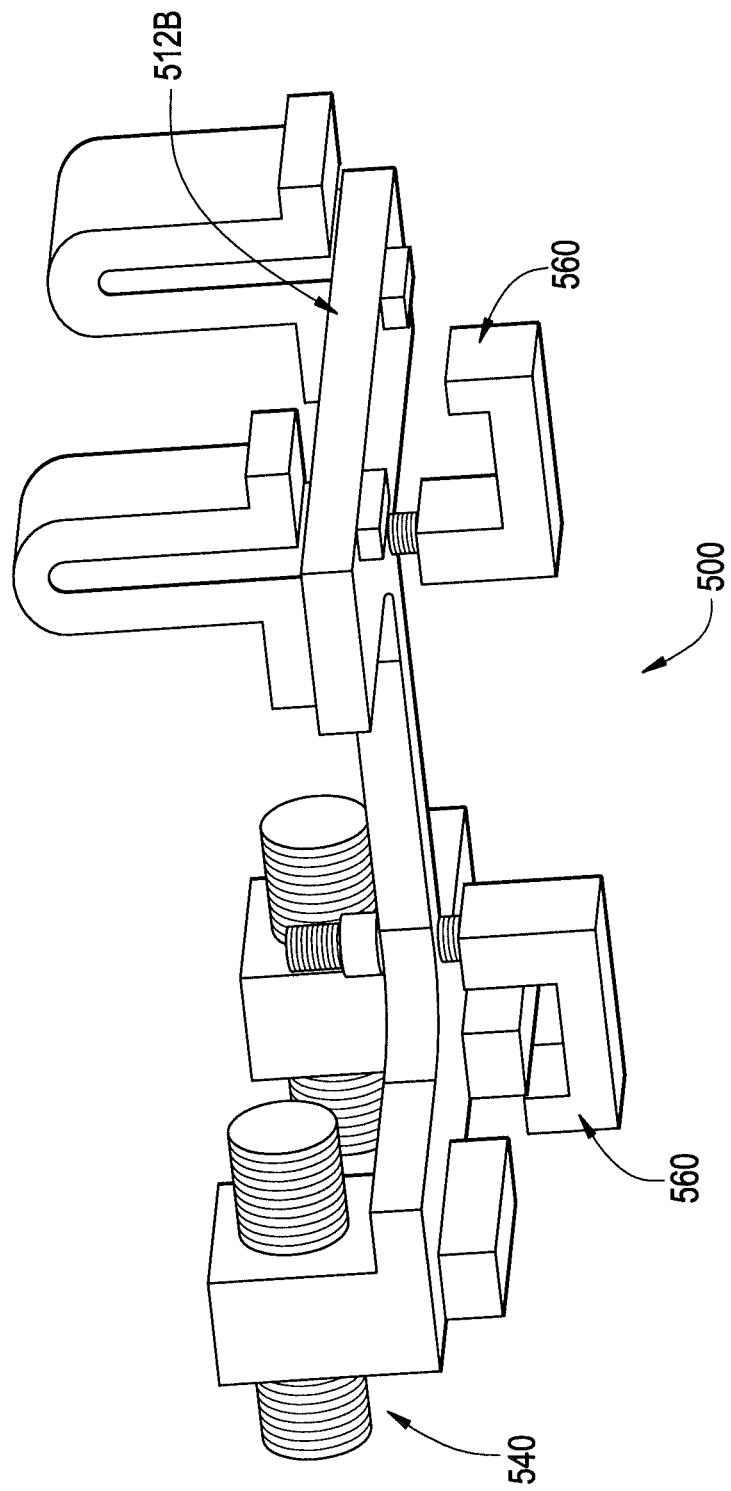
FIG. 11 is another view of the torsional restraint system according to the third example embodiment of the present invention.

FIGS. 10-11 represent another example of a torsional restraint system 5000. Rather than attaching hard stop units on or to the restrainer brackets 100, a hard stop unit 500 may be provided on top of the transition assembly 40. FIG. 10 illustrates an example hard stop unit 500 which is configured to attach to the transition assembly 40 to prevent or retard torsional rotation of the riser pipe 30. As illustrated in FIG. 10, the example hard stop unit 500 may include an I-shaped plate 510 which includes a first substantially horizontal member 512A facing the reactor pressure vessel wall 15, a second substantially horizontal member 512B facing the shroud wall 16, and a third substantially horizontal member 514 connecting the first member 512A to the second member 512B.

Although the I-shaped mounting plate 510 is described as having three members 512A, 512B, and 514, one skilled in the art would readily understand that the I-shaped mounting plate 510 may be comprised of a single plate having three regions corresponding to the three members 512A, 512B, and 514 rather than a mounting plate formed from three separate plates. Accordingly, members 512A, 512B, and 514 may correspond to either regions of a single plate or separate plates combined together to form a single I-shaped mounting plate 510. In the event the I-shaped mounting plate 510 is comprised of three separate plates, the plates may be combined by bolting or welding.

As shown in FIGS. 10 and 11, the torsional restraint system 5000 also includes mounting hooks 560 for attaching the I-shaped mounting plate 510 to the transition assembly 40. Each of the mounting hooks 560 include a threaded member 570 which is configured to pass through a hole in member 514 of the "I" shaped mounting plate 510. A nut 580 may be provided to secure the connection between the mounting hooks 560 and the "I" shaped mounting plate 510. As the nut 580 is tightened the mounting hook 560 is drawn upwards and into a portion of the transition assembly 40 to clamp the "I" shaped mounting plate to the transition assembly 40.

In FIG. 10, the first horizontal member 512A faces the reactor pressure vessel wall 15 and the second horizontal member 512B faces the shroud wall 16. The first horizontal member 512A may include two brackets 520 which may each be threadingly engaged with contact members 540. The contact members 540, for example, may be threaded members, for example, threaded bolts. For example, the contact members 540 may include a portion with external threads and the brackets 520 may include holes with internal threads for engaging the external threads of the contact members 540. Because the contact members 540 may be threadingly engaged with the brackets 520, the length of the contact members 540 protruding from the brackets 520 may be field adjusted to assure a proper fit between the brackets 520, the contact members 540, and the reactor pressure vessel wall 15. For example, the length of the contact members 540 protruding from the brackets 520 may be adjusted to contact, or nearly contact, the reactor pressure vessel wall 15.

Although the above described example embodiment describes a hard stop unit 500 as including at least two separate pieces 520 and 540, this example embodiment is not limited thereto. For example, at least one of the contact members 540 and one of the brackets 520 may be provided as one integral hard stop. In this example, the contact member 540 may be fabricated longer than necessary so that the contact member 540 may be field cut in order to assure proper fit-up between the contact member 540 and the wall of the reactor pressure vessel 15. As another example, the contact member 540 may be dimensioned and rigidly attached to the bracket 520 so that field adjustment is not necessary. As in any of the aforementioned examples, the components of the hard stop unit 500 may be made from a stainless steel, for example, 316 stainless steel, however, this example embodiment is not limited thereto as one skilled in the art would recognize various suitable materials which may be substituted for stainless steel.

As illustrated in FIGS. 10 and 11, the torsional restraint system 5000 may include compliant springs 550 attached to the second member 512B. The compliant springs 550 may be attached to member 512B via bolting, clamping, or welding. The compliant springs 550 may, for example, be fabricated from a nickel based alloy, for example, X750. The compliant springs 550 may be configured to contact or nearly contact the shroud wall 16. As one skilled in the art would readily recognize, there are conditions where the shroud wall 16 will thermally expand at a rate greater than the expansion of the reactor pressure vessel wall 15. Accordingly, the Applicants note the compliant springs 550 should be constructed so as to allow for the deflection of the shroud wall 14 to occur without imparting significant stress to plate 510.

As illustrated in FIGS. 10-11, the hard stop unit 500 is provided with brackets 520 and contact members 540 that are positioned on different sides of the riser pipe 30. Accordingly, in the event the riser pipe 30 is vibrationally excited at a frequency at or near a torsional frequency of the jet pump assembly 25, the brackets 520 and contact members 540 of the hard stop unit 500 would prevent or retard the jet pump assembly 25 from undergoing relatively large rotational oscillations. Thus the hard stop unit 500 would prevent or retard the jet pump assembly 25 from generating relatively large stresses in the weld 80.

While example embodiments have been particularly shown and described with reference to example embodiments thereof, it will be understood by those of ordinary skill in the art that various changes in form and details may be made therein without departing from the spirit and scope of the following claims. For example, although each of the systems 2000, 4000, and 5000 have been described independently, none of the systems are mutually exclusive of one another and a combination of any of the aforementioned systems is considered within the scope of the invention.

What is claimed:

1. A torsional restraint system for a jet pump assembly, the jet pump assembly including a riser pipe located between, and in fluid communication with, a first and a second inlet mixer, the jet pump assembly including a restrainer bracket with first and second yolk members clamping the first and second inlet mixers to the riser pipe, the jet pump assembly being located in an annulus between a shroud wall and a reactor pressure vessel wall, the torsional restraint system comprising:
a first contact member operatively attached to a side of the jet pump assembly;
a second contact member operatively attached to the side of the jet pump assembly and disposed from the first contact member, the first and second contact members horizontally extending from the jet pump assembly toward the reactor pressure vessel wall to restrain movement of the first and second inlet mixers toward the reactor pressure vessel wall such that the riser pipe is restrained from rotating about a centerline of the riser pipe;
a first bracket supporting the first contact member; and
a second bracket supporting the second contact member wherein the first and second brackets are attached to the first and second yolk members of the restrainer bracket and are arranged between the first and second yolk members and the reactor pressure vessel wall.

2. The system of claim 1, further comprising:
first and second compliant spring units attached to the first and second yolk members of the restrainer bracket and are arranged between the first and second yolk members and the shroud wall.

3. The system of claim 1, further comprising:
a mounting plate between the first and second inlet mixers, the mounting plate being configured to support the first and second brackets.

4. The system of claim 3, wherein the mounting plate is U-shaped and includes
a first member between the riser pipe and the first inlet mixer,
a second member between the riser pipe and the second inlet mixer, and
a third member connecting the first and second members, the third member being arranged between the riser pipe and the reactor pressure vessel wall.

5. The system of claim 4, wherein the first and second brackets are on the third member.

6. The system of claim 4, wherein
the first member includes an accessory member configured to attach the first member to the restrainer bracket,
the second member includes a second accessory member configured to attach the second member to the restrainer bracket, and
the third member includes a third and a fourth accessory member including pinch bolts,
wherein the first, second, third, and fourth accessory members cooperatively secure the first, second, and third members to the restrainer bracket.

7. The system of claim 4, further comprising:
a first compliant spring unit on an end of the first member facing the shroud wall; and
a second compliant spring unit on an end of the second member facing the shroud wall.

8. The system of claim 1, wherein
the first bracket includes a first internally threaded hole and the first contact member includes an externally threaded portion configured to engage the first internally threaded hole, and
the second bracket includes a second internally threaded hole and the second contact member includes an externally threaded portion configured to engage the second internally threaded hole.

9. The system of claim 1, further comprising:
a first compliant spring unit attached to the jet pump assembly;
a second compliant spring unit attached to the jet pump assembly and disposed from the first compliant spring unit,
the first and second compliant spring units horizontally extending from the jet pump assembly toward the shroud wall and being configured to restrain movement of the first and second inlet mixers toward the shroud wall.

10. A torsional restraint, comprising:
a U-shaped mounting plate including a horizontal main member with a first and a second member extending horizontally from the main member in a first direction, the first and second members being about parallel to each other;
a first bracket on the main member arranged near the first member;
a second bracket on the main member arranged near the second member;
a first contact member extending horizontally from the first bracket in a second direction;
a second contact member extending horizontally from the second bracket in the second direction, the second direction being about opposite to the first direction;
first and second accessory members vertically extending from a lower surface of the main member, each of the first and second accessory members including a hole engaging horizontally extending pinch bolts;
a first L-shaped accessory member vertically extending from a bottom surface of the first member; and a second L-shaped accessory member vertically extending from a bottom surface of the second member.

11. The torsional restraint of claim 10, further comprising:
a first compliant spring extending horizontally from the first member;
a second compliant spring extending horizontally from the second member, the first and second compliant springs each extending in the first direction.

12. The torsional restraint of claim 10, further comprising:
a first foot on a distal end of the first L-shaped member;
a second foot on a distal end of the second L-shaped member, wherein the first and second foot each horizontally extend from the first and second L-shaped members in the second direction.

13. The torsional restraint of claim 10, wherein the pinch bolts are about parallel to the first and second contact members.

14. A torsional restraint system for a jet pump assembly, the jet pump assembly including a riser pipe located between, and in fluid communication with, a first and a second inlet mixer, the jet pump assembly including a restrainer bracket with first and second yolk members clamping the first and second inlet mixers to the riser pipe, the jet pump assembly being located in an annulus between a shroud wall and a reactor pressure vessel wall, the torsional restraint system comprising:
a first contact member operatively attached to a side of the jet pump assembly;
a second contact member operatively attached to the side of the jet pump assembly and disposed from the first contact member, the first and second contact members horizontally extending from the jet pump assembly toward the reactor pressure vessel wall to restrain movement of the first and second inlet mixers toward the reactor pressure vessel wall such that the riser pipe is restrained from rotating about a centerline of the riser pipe;
a first bracket supporting the first contact member; and
a second bracket supporting the second contact member
wherein the first bracket includes a first internally threaded hole and the first contact member includes an externally threaded portion configured to engage the first internally threaded hole, and
wherein the second bracket includes a second internally threaded hole and the second contact member includes an externally threaded portion configured to engage the second internally threaded hole.

15. A torsional restraint system for a jet pump assembly, the jet pump assembly including a riser pipe located between, and in fluid communication with, a first and a second inlet mixer, the jet pump assembly including a restrainer bracket with first and second yolk members clamping the first and second inlet mixers to the riser pipe, the jet pump assembly being located in an annulus between a shroud wall and a reactor pressure vessel wall, the torsional restraint system comprising:
a first contact member connected to the first inlet mixer;
a second contact member connected to the second inlet mixer, the first and second contact members horizontally extending from the first and second inlet mixers toward the reactor pressure vessel wall to restrain movement of the first and second inlet mixers toward the reactor pressure vessel wall such that the riser pipe is restrained from rotating about a centerline of the riser pipe.

* * * * *